US011831989B2

United States Patent
Swanson et al.

(10) Patent No.: US 11,831,989 B2
(45) Date of Patent: Nov. 28, 2023

(54) ENHANCED CONTROLLER SYNCHRONIZATION VERIFICATION

(71) Applicant: X Development LLC, Mountain View, CA (US)

(72) Inventors: Thomas Robert Swanson, Sunnyvale, CA (US); Andrew Rossignol, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 18/168,306

(22) Filed: Feb. 13, 2023

(65) Prior Publication Data

US 2023/0262338 A1    Aug. 17, 2023

Related U.S. Application Data

(63) Continuation of application No. 17/323,310, filed on May 18, 2021, now Pat. No. 11,582,397.

(51) Int. Cl.
*H04N 23/74* (2023.01)
*H04N 23/71* (2023.01)
(Continued)

(52) U.S. Cl.
CPC ............ *H04N 23/71* (2023.01); *A01K 61/13* (2017.01); *H04N 23/74* (2023.01); *H04N 23/90* (2023.01)

(58) Field of Classification Search
CPC .... H04N 5/2351; H04N 5/2354; H04N 5/247; A01K 61/95; A01K 61/13
(Continued)

(56) References Cited

U.S. PATENT DOCUMENTS 10,863,727 B2    12/2020   Jans
2013/0273599 A1   10/2013  Robitaille
(Continued)

FOREIGN PATENT DOCUMENTS

CL    2019000039 A1   3/2019
EP       2962556       1/2016
(Continued)

OTHER PUBLICATIONS

Maloy et al., "A spatio-temporal recurrent network for salmon feeding action recognition from underwater videos in aquaculture," Computers and Electronics in Agriculture, Nov. 12, 2019, 9 pages.
(Continued)

*Primary Examiner* — Ayman A Abaza
(74) *Attorney, Agent, or Firm* — Fish & Richardson P.C.

(57) ABSTRACT

Methods, systems, and apparatus, including computer programs encoded on a computer storage medium, that validate the synchronization of controllers in an aquaculture environment. One of the methods includes an image processor that receives images generated by a first image generating device that includes a light filter that is associated with light of a particular light frequency while an aquaculture environment was illuminated with light. Based on the image that was generated by the first image generating device, the image processor determines whether the intensity value of the light frequency in the image satisfies a threshold value. Based on determining whether the intensity value of the light frequency in the image satisfies the threshold value, the image processor determines whether the aquaculture environment was illuminated with light of the particular light frequency when the image was generated. The image processor provides for output an indication of whether the aquaculture was illuminated with light of the particular frequency when the image was generated.

20 Claims, 4 Drawing Sheets

(51) Int. Cl.
*A01K 61/13* (2017.01)
*H04N 23/90* (2023.01)

(58) Field of Classification Search
USPC .......................................................... 348/81
See application file for complete search history.

(56) References Cited

U.S. PATENT DOCUMENTS

| | | |
|---|---|---|
| 2015/0136037 A1 | 5/2015 | Boonekamp |
| 2018/0000055 A1 | 1/2018 | Tanase |
| 2018/0027637 A1 | 1/2018 | Kurt |
| 2019/0363791 A1 | 11/2019 | Teo |
| 2020/0113158 A1 | 4/2020 | Rishi |
| 2020/0288679 A1 | 9/2020 | Howe |
| 2020/0288680 A1 | 9/2020 | Howe |
| 2021/0080715 A1 | 3/2021 | Saxena |
| 2021/0142052 A1 | 5/2021 | James |
| 2021/0400213 A1 | 12/2021 | Okuike |

FOREIGN PATENT DOCUMENTS

| | | |
|---|---|---|
| GB | 2539495 | 12/2016 |
| JP | 2001190488 | 7/2001 |
| NO | 20160199 | 8/2017 |
| WO | WO2012081990 | 6/2012 |
| WO | WO2017137896 | 8/2017 |
| WO | WO2018011745 | 1/2018 |
| WO | WO 2019/121900 | 6/2019 |
| WO | WO 2020/180188 | 9/2020 |

OTHER PUBLICATIONS

Odey, "AquaMesh—Design and Implementation of Smart Wireless Mesh Sensor Networks for Aquaculture," American Journal of Networks and Communications, Jul. 2013, 8 pages.

PCT International Search Report and Written Opinion in International Appln. No. PCT/US2020/066800, dated Mar. 11, 2021, 15 pages.

PCT International Search Report and Written Opinion in International Appln. No. PCT/US2021/023104, dated Jun. 18, 2021, 13 pages.

Petrov et al., "Overview of the application of computer vision technology in fish farming," E3S Web of Conferences, 2020, 175:02015.

Saberloon et al., "Application of Machine Vision Systems in Aquaculture with Emphasis on Fish: State-of-the-Art and Key Issues," Reviews in Aquaculture, Dec. 2017, 9:369-387.

Towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.

Wang, "Robust tracking of fish schools using CNN for head identification," Multimedia Tools and Applications, Nov. 2017, 20 pages.

ENHANCED CONTROLLER SYNCHRONIZATION VERIFICATION

CROSS-REFERENCE TO RELATED APPLICATIONS

This application claims priority to U.S. application Ser. No. 17/323,310, filed May 18, 2021, the contents of which are incorporated herein by reference in their entirety.

TECHNICAL FIELD

This specification relates to controllers, and one particular implementation describes a framework for verifying the synchronization of controllers for underwater lights and cameras.

BACKGROUND

A controller is a device that is responsible for orchestrating the operation of one or more connected devices. Examples of connected devices include illumination devices, such as light sources, and imaging devices, such as cameras. Illumination and imaging devices are used in aquaculture or agriculture to monitor organisms being cultivated in an aquaculture or agriculture environment.

Illumination devices and imaging devices are used to monitor organisms that are raised in an aquaculture or agriculture environment. For example, an illumination device might illuminate a farmed fish, and an imaging device might generate images of the illuminated fish. Such images can be used to estimate the health of a farmed fish, for example to detect the presence of ectoparasites such as sea lice.

SUMMARY

This specification describes a framework implemented as computer programs on one or more computers in one or more locations that verifies the synchronization of controllers in an aquaculture or agriculture environment. More specifically, this specification describes a framework that verifies the synchronization of devices, including cameras and illumination devices, that are each configured to produce light in a specific frequency range, and that capture images of scenes illuminated by the specific frequencies of light at specific times. An image illuminated by light in the proper frequency range for the image can be used by a machine learning model to identify parasites. However, an image illuminated by light outside the proper frequency range for the machine learning model, e.g., an image that is illuminated by light that is "out of sync," should not be used as it could result in spurious identifications.

To better ensure that images are captured when light of a particular frequency is present, the operation of each camera should be precisely synchronized with its corresponding illumination device. In addition, the illumination devices should be synchronized with each other to ensure that only light in a desired frequency range is present when an image is captured. If a scene is illuminated with no light, no useful image is produced; if the scene is illuminated with light in multiple frequency ranges, machine learning models that evaluate the images to determine whether parasites are present can be less accurate. To prevent such inaccuracies, it is important to detect when synchronization among devices is disturbed.

However, synchronization can be disturbed for a variety of reasons. For example, electrical disturbances in the environment can block some of the signals used for synchronization. Physical connections among devices can become faulty over time, resulting in lost or spurious synchronization signals. The system can be incorrectly configured or calibrated.

By attaching a filter to at least one camera and evaluating the resulting images, the framework described in this specification can determine whether the devices are properly synchronized. When the framework determines that the devices are not properly synchronized, images captured during the period of improper synchronization can be withheld from the systems that perform parasite detection on the images, improving the accuracy of the parasite detection systems.

Particular embodiments of the subject matter described in this specification can be implemented so as to realize one or more of the following advantages. The techniques described below can verify the synchronization of devices in an aquaculture environment. Synchronizing illumination with image capture allows the system to capture an image illuminated when the illumination is within an expected range of light frequencies. In addition, different images can be captured that are illuminated with different light frequency ranges at different times, for example, by alternating red and blue light. Such properly illuminated images are critical to identifying parasite infestations, for example, by providing the images to machine learning models trained to identify parasites. Further, it has been shown that by capturing images that are illuminated by light in different frequency ranges, and providing the images to machine models allows the models to more accurately predict the presence of parasites. However, for the machine learning models to make accurate predictions of parasite infestation, each image should be illuminated by a specific frequency range. Therefore, verifying synchronization assists in identifying parasite infestations.

In addition, the techniques described below can verify the synchronization of devices using only imaging devices capable of capturing images in black and white instead of requiring imaging devices capable of capturing color images. Using only black and white camera enables the continued use of cameras currently used in aquaculture agriculture instead of replacing those camera systems with color cameras.

One aspect features an image processor that receives images generated by a first image generating device that includes a light filter that is associated with light of a particular light frequency while an aquaculture environment was illuminated with light. Based on the image that was generated by the first image generating device, the image processor determines whether the intensity value of the light frequency in the image satisfies a threshold value. Based on determining whether the intensity value of the light frequency in the image satisfies the threshold value, the image processor determines whether the aquaculture environment was illuminated with light of the particular light frequency when the image was generated. The image processor provides for output an indication of whether the aquaculture was illuminated with light of the particular frequency when the image was generated.

One or more of the following features can be included. The frequency can be in range 400 terahertz to 790 terahertz. The frequency can be in the range 430 terahertz to 490 terahertz. The frequency is in the range 620 terahertz to 680 terahertz. Based on determining that the aquaculture environment was illuminated with light of the particular light frequency when the image was generated, the image processor can generate an error indicator. The image processor can receive a second image that was generated by a second image generating device that includes a second light filter that is associated with light of a second particular light frequency and while an aquaculture environment was illuminated with light, and based on determining that the aquaculture environment was not illuminated with light of the particular light frequency when the second image was generated, the image processor can generate an indicator that the second image is properly illuminated. The image processor can determine that the aquaculture environment was not illuminated with light of the particular light frequency when the second image was generated, and in response, deliver to a parasite detection system the second image. The received image can be generated while the aquaculture environment was illuminated with light of a frequency that was not determined at the time the received image was generated.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
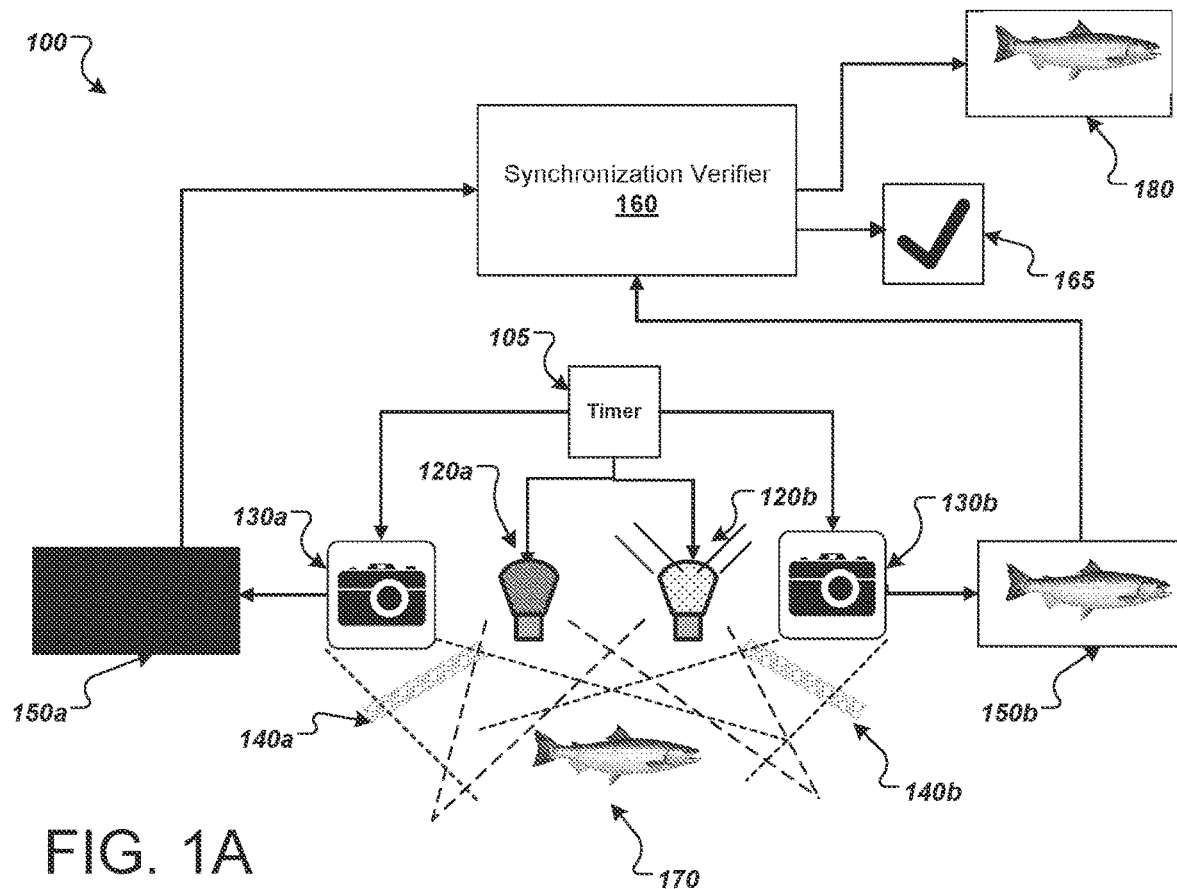
FIGS. 1A and 1B are illustrations of a framework for verifying controller synchronization.
Figure 1B:
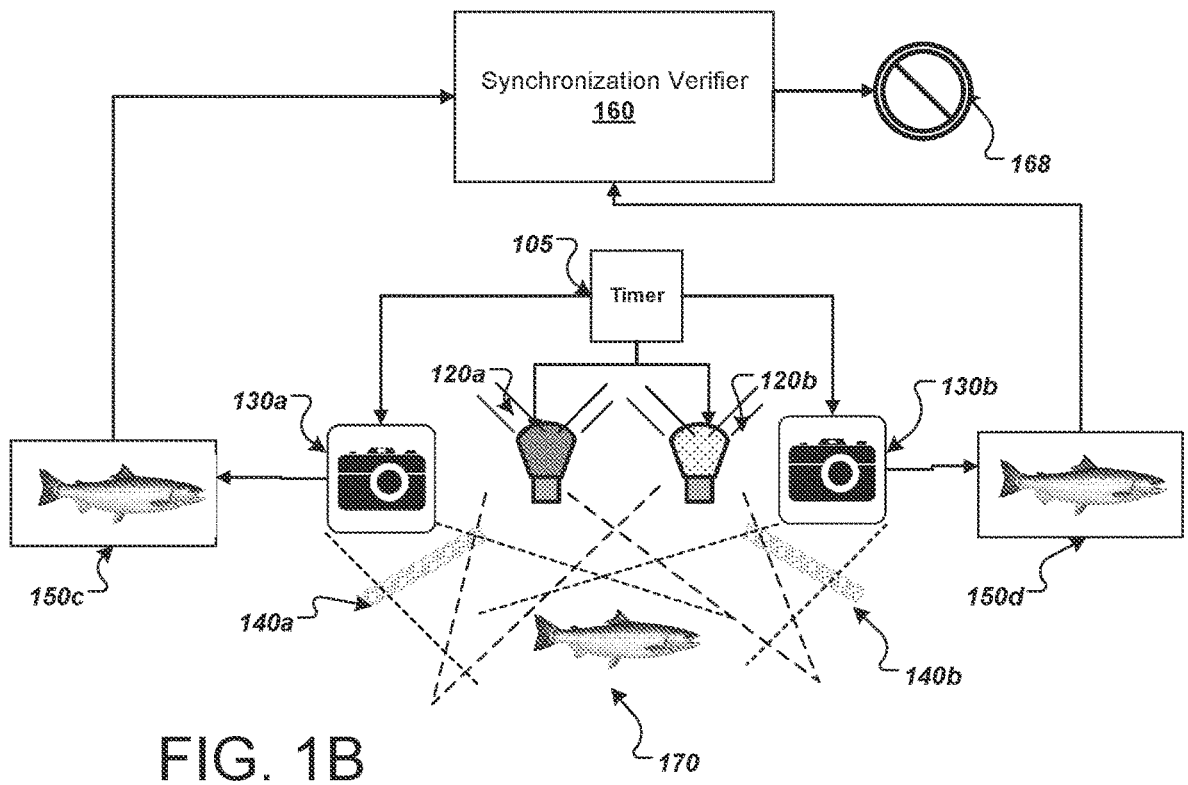

FIGS. 1A and 1B are illustrations of a framework for verifying controller synchronization. The framework can include of a plurality of hardware devices including light sources 120a, 120b, cameras 130a, 130b, light filters 140a, 140b, one or more timers 105 and a synchronization verifier 170. The timer can generate timing pulses that, when the framework is operating properly, cause the light sources 120a, 120b and cameras 130a, 130b to operate according to a configured synchronization schedule. If the operation of one or more devices diverges from the schedule, images of organisms in the aquaculture environment produced by the cameras 130a, 130b can be improperly illuminated, which can result in improper identification of parasitic infestations within the environment.

The framework of FIG. 1 can be used in an aquaculture environment. Aquaculture includes the farming of marine organisms such as fish, crustaceans and mollusks. Aquaculture is important to the health of marine ecosystems, which can suffer from overharvesting. Some reports have indicated that over half of all fish and shellfish come from aquaculture, and in the absence of aquaculture, substantial, and perhaps irreversible, strain on marine ecosystems could result.

One challenge that exists in aquaculture is parasites, such as sea lice, which can cause skin erosion and hemorrhaging, gill congestion, and increased mucus production. Parasites harm both the welfare of the organisms being farmed, and also the yield produced by an aquaculture environment. Thus, the detection and reduction of parasites in an aquaculture environment provides multiple benefits.

Mitigating the impact of parasites first requires identifying a parasitic infestation. Only after an organism, such as a fish, has been identified as being infested with parasites, such as sea lice, can mitigation techniques can be applied. For example, if a fish is known to be infested, directed energy, e.g. lasers, can be aimed at the sea lice on the fish in order to destroy or dislodge the sea lice, or the fish can be identified and removed for delousing.

It has been shown that illuminating sea lice with light of certain frequencies enables sea lice detection. For example, images of fish created with light of a given frequency can be passed to a trained machine learning model that can predict whether the fish is infested with sea lice. Such predictions greatly reduce the cost and complexity of identifying sea lice infections.

In addition, it has been further shown that by illuminating fish with light of two frequencies, one at a time, multiple images can be produced, and using these multiple images, trained machine learning models can more accurately predict whether the fish is infested with sea lice.

To better ensure that proper images are produced, a framework should synchronize various controllers, such as controllers that manage imaging devices and controllers that manage illumination devices. For example, to ensure there is sufficient light for an image, and specifically light in the correct frequency range, the operation of imaging controllers should be synchronized with the operation of an illumination controllers. However, that is not sufficient: to avoid illumination with multiple frequency ranges at the same time, the operation of illumination controllers must also be coordinated. Should any controller operate out of synch with another controller, light of multiple frequency ranges can illuminate the scene, and the presence of multiple frequency ranges will result in improperly illuminated images. As noted above, improperly illuminated images can result in inaccurate predictions regarding the presence of parasites.

However, aquaculture environments are harsh, and maintaining synchronization across controllers for a sustained period of time is challenging. As noted above, electrical disturbances in the environment can block some of the signals used for synchronization, physical connections among devices can become faulty over time, the system can be incorrectly configured or calibrated, or electromagnetic interference can creates spurious signals.

Since synchronization can be disturbed, early detection of synchronization errors is important to the proper ongoing operation of the system. Once a synchronization error is detected, resynchronization efforts, such as resetting the components, can restore correct synchronization, allowing the system to again produce the properly illuminated images needed for parasite detection. Further, to reduce the complexity of the system, it is preferable to detect synchronization errors by introducing few additional system components and, where possible, to use components that already exist in some aquaculture environments.

With that background, FIG. 1A shows the process of determining that the system is synchronized. In the example of FIG. 1A, the system has two imaging devices 130a and 130b that can be used both to verify that the devices are synchronized and to capture images of the organisms in the aquaculture environment, and two illumination devices 120a, 120b.

The imaging devices can be any camera-type device capable of operating in an aquaculture environment. However, it is preferable that the imaging devices be black and white cameras as black and white cameras are more sensitive and therefore more effective in low-light conditions than are color cameras.

The first imaging device 130a can have a first attached filter 140a that is associated with light of a particular light frequency range, and more specifically, the filter 140a can be designed to permit light of the first particular frequency range. In this example, the filter 140 permits red light—for example, a band of frequencies in the range 430 to 490 terahertz. Therefore, if a scene is illuminated only with red light, an image captured by that image device 130a will appear illuminated. In contrast, if a scene is illuminated with light in another frequency range, for example, blue light, an image captured by that image device 130a will appear dark.

The second imaging device 130b has a second attached filter 140b that is associated with light of a second particular frequency range, and more specifically, the filter 104b is designed to permit light of the second particular frequency range. In this example, the filter 140b permits blue light—for example, a band of frequencies in the range 620 to 680 terahertz. Therefore, if a scene is illuminated only with blue light, an image captured by that image device 130b will appear illuminated. In contrast, if a scene is illuminated with light in another frequency range, for example, red light, an image captured by that image device 130b will appear dark. In the figure, a dashed line indicates the field of view of the camera devices 130a, 130b.

The system also contains two illumination devices: a first illumination device 120a that produces light in a first given frequency range and a second illumination device 120b that produces light of in second given frequency range. In this example, the first illumination 120a device produces red light—that is, light in the range 430 to 490 terahertz—and the second illumination 120b device produces blue light—that is, light in the range 620 to 680 terahertz.

In FIG. 1A, a dashed line indicate the field of illumination of the lighting devices 120a, 120b. In this example, the illumination fields of the lighting devices 120a, 120b and fields of view of the cameras 130a, 130b overlap an area in which a fish 170 is present.

The timer enables synchronized action of the devices by emitting pulses at configured intervals. Upon receiving a pulse from the timer, and based on configured settings, the lighting devices 120a, 120b and cameras 130a, 130b determine whether to take action. Actions for a lighting device can include turning on or off illumination; actions for a camera can include taking one image or a series of images.

In this example, the blue light 120b has illuminated the fish 170, the camera 130a with the red filter 140a has captured image 150a, and the camera 130a with the blue filter 140b has captured image 150b. The red light 120a is not illuminated.

The synchronization verifier 160 can analyze the image 150a, i.e., the one taken by the camera 130a with the red filter 140a, to determine the intensity of the light captured. If the image is dark—that is, the intensity of the light captured by the image is below a configured threshold—then the framework can verify that the components are synchronized, and that the second image 150b is properly illuminated. In this example, the image 150a is completely dark, so the framework can determine that the synchronization is valid, and that the second image 150b, taken by a camera 130b with a blue filter and illuminated by blue light, is properly illuminated.

Having determined that the synchronization is valid, the synchronization verifier 160 can produce an indication of valid synchronization 165. The image 180, verified as properly illuminated, can be made available to a system that detects parasitic infection. For example, such a system can be a machine learning classifier model that produces a value that represents the likelihood of a parasitic infection, and if that value is above a configured threshold, the system can predict that parasites are present. One example of such system is described in U.S. patent application Ser. No. 16/743,023, filed Jan. 15, 2020, which is incorporated herein by reference.

In FIG. 1B, both the red light 120a and the blue light 120b have illuminated the fish 170, the camera 130a with the red filter 140a has captured image 150c, and the camera 130b with the blue filter 140b has captured image 150d.

The synchronization verifier 160 can analyze the image 150c, i.e., the one taken by the camera 130a with the red filter 140a, to determine the intensity of the light captured. As described above, if the image is dark, then the framework can verify that the components are synchronized. However, in this case, the scene was illuminated both by blue light and by red light, and the red light penetrates the red filter 140a. As a result, the image 150c is not dark, so the synchronization verifier 160 can determine that the system is not properly synchronized.

The synchronization verifier 160 can produce an indication 168 that the system is not properly synchronized, along with other optional status information. For example, the system can make either or both improperly illuminated images available for error analysis. Also, the system can take corrective action, as described in reference to FIG. 3.

Figure 2:
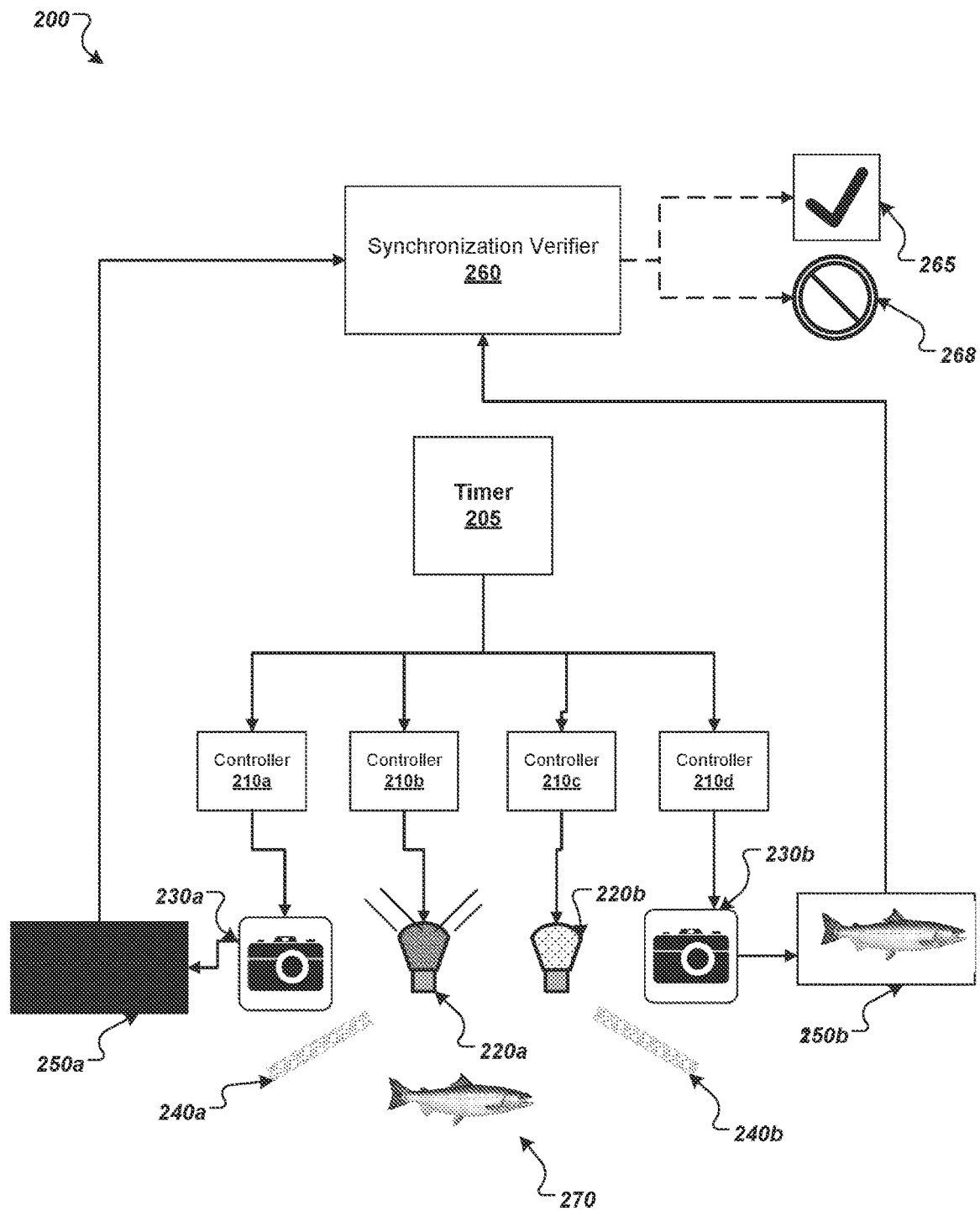
FIG. 2 is a block diagram of an example system for verifying controller synchronization.

FIG. 2 is a block diagram of an example system 200 for verifying controller synchronization. Components of the system 200 can include a timer 205, controllers 210a-210d responsible for directing the operation of devices that can include illumination devices 220a, 220b and cameras 230a, 230b, or alternate types of imaging devices. At least one camera 230a, 230b is coupled to a filter 240a, 240b; additional cameras 230a, 230b can also be coupled to a filter 240a, 240b. The system 200 can also include a synchronization verifier 260.

The timer 205 can generate timer pulses at a particular clock frequency. The clock can be, for example, a quartz crystal oscillator that creates a stable, periodic electromagnetic signal or vibration and can generate a timer pulse for each signal. Alternatively, the timer 205 can contain an oscillator and generate one timer pulse each time it receives a configured number of signals from the oscillator. For example, the timer 205 might generate one timer pulse for each 1000 signals it receives from the oscillator.

The controllers 210a-210d can accept timer pulses and direct the actions of associated devices 220a, 220b, 230a, 230b. Each controller 210a-210d, upon receiving timer pulses from the timer 205, can take actions based on configuration information available to each controller 210a-210d as described in more detail in reference to FIG. 3.

Actions taken by a controller can be specific to the device associated with the controller. For example, for an illumination device, actions can include illuminating the device for a specific duration. If the illumination device can illuminate in multiple frequencies, the action can specify the frequency to be used. For an imaging device, the action can include an indication that an image should be captured, and optionally include imaging parameters such as exposure length, aperture, etc., depending on the capabilities of the imaging device.

The configuration information can be stored in nonvolatile memory associated with a controller 210a-210d. Alternatively, configuration information can be loaded dynamically into volatile memory, for example, when the system 200 begins operation. For example, configuration information can made available to the system 200 by placing the configuration information in storage accessible to the system 200, or by delivering the configuration information over a network connected to the system 200. When configuration information is provided to the system 200 dynamically, the system 200 loads the configuration information into the controllers 210a-210d.

Each controller 210a-210d can act upon receipt of each timer pulse or act only on select timer pulses depending on the configuration information, and the configuration of each controller can differ. If a specific controller, e.g., 210a, is configured to act only on a select set of actionable timer pulses, the configuration information can specify the offset and period of actionable pulses. The offset can be the number of pulses to ignore before taking a first action, and the offset can be the number of pulses until the next action is taken. For example, if the offset is 2 and the period is 4, then the controller will act on pulses 2, 6, 10, 14, and so on. More complex structures for pulse actions can also be used. For example, the configuration information might specify that a controller, e.g., 210a, should act on the second pulse, then the fourth pulse, then eighth pulse, then tenth pulse, and continuing to follow a "skip 1, skip 2, skip 1 . . . " pattern.

Devices 220a, 220b, 230a, 230b in the system 200 act based on commands sent by their associated controllers. For example, in response to a directive from a camera controller 210a, 210d, a camera device 230a, 230b can capture an image. In another example, in response to a directive from an illumination controller 210b, 210c, an illumination device 220a, 220b can generate illumination for a duration specified by the illumination controller 210b, 210c.

Filters 240a, 240b can be coupled to camera devices 230a, 230b and block light of one or more frequencies. For example, the system 200 can include a filter that blocks all light except red light—that is, light in the range 430 to 490 terahertz—thereby allowing only red light to pass. In addition, the system 200 can include another filter that blocks all light except blue light—that is, light in the range 620 to 680 terahertz—thereby allowing only blue light to pass.

A synchronization verifier 260 can receive an image 250a captured by a camera device 230a that optionally has an attached filters 230a. The synchronization verifier can determine, based on an analysis of the image 250a, whether the controllers are synchronized, as described in greater detail with reference to FIG. 3. A synchronization verifier 260 can also receive an image 250b captured by a second camera device 230b that optionally has an attached filters 230b.

When the synchronization verifier 260 determines that the system is synchronized, the synchronization verifier 260 can produce an indication 265 that the system is synchronized; alternatively, when the synchronization verifier 260 determines that the system is not synchronized, the synchronization verifier 260 can produce an indication 268 that the system is not synchronized. Optionally, the synchronization verifier 260 can output one or both images 250a, 250b.

Figure 3:
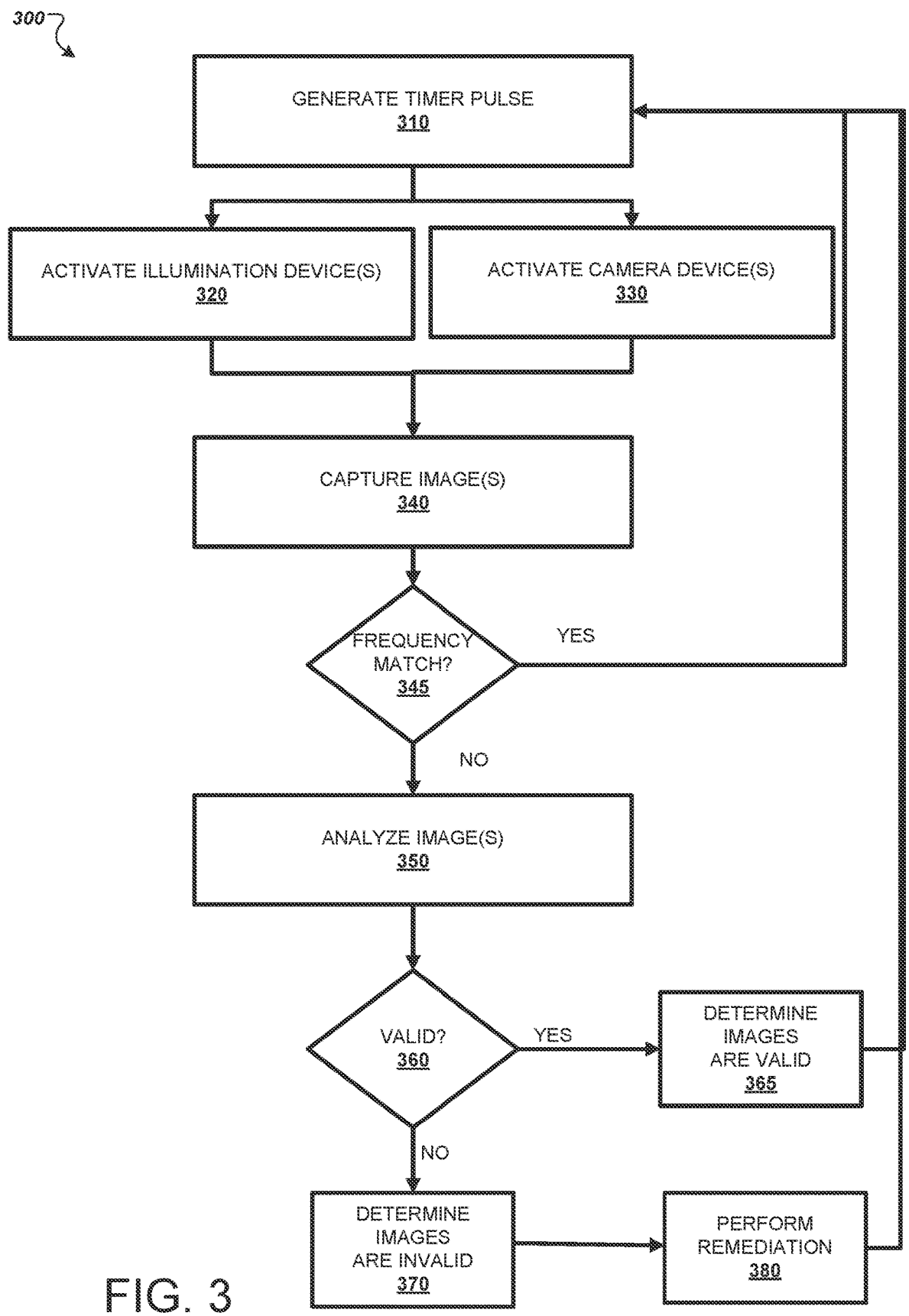
FIG. 3 is a flow diagram of an example process to verify controller synchronization.

FIG. 3 is a flow diagram of an example process to verify controller synchronization. For convenience, the process 300 will be described as being performed by a system of one or more computers located in one or more locations. For example, a system for verifying controller synchronization, e.g., the system for verifying controller synchronization 200 of FIG. 2, appropriately programmed in accordance with this specification, can perform the process 300.

In operation 310, the system generates a timer pulse. As described in reference to FIG. 2, the system can contain an oscillator that generates signals at regular intervals. The system can maintain a count of signals received from the oscillator, and once the count reaches a configured threshold, create a timer pulse. For example, if the oscillator produces signals at 12 kHz (12,000 pulses per second) and the system is configured to produce timer pulses at 120 Hz (120 pulses per second), then the system will increment a counter each time a signal is received until the counter reaches 100. Upon receiving a signal that brings the counter to 100, the system will set the counter back to zero and generate a timer pulse. Alternatively, the system can generate a timer pulse for each oscillator signal received, in which case, a counter is not necessary.

After operation 310, the system can execute operations 320 and 330 in sequence or in parallel—that is, substantially at the same time or with interleaved execution.

In operation 320, the system actives one or more illumination devices. As described with reference to FIG. 2, the system can contain controllers that have attached one or more illumination devices. A controller can receive a timing pulse generated in operation 310 and in response, activate one or more attached illumination device.

In some implementations, a controller can be configured to activate an attached illumination device only after receiving a configured number of timing pulses. In such cases, the controller can increment a counter upon receiving each timing pulse. Once the counter reaches the configured threshold, the controller can reset the counter to zero and activate the illumination device. In addition, the controller can ignore a configured number of pulses before beginning to increment the counter. For example, a controller can be configured to activate an illumination device upon receiving the second timing pulse and every fourth pulse thereafter. In this example, the controller can initially set the counter to 2, which would cause the controller to ignore the first timer pulse, activate on the second timing pulse, ignore pulses 3 to 5, activate on pulse 6 and so on. Allowing controllers to stagger activation—that is, allowing devices to begin on different pulses and potentially operating after differing number of pulses—enables more flexible synchronization approaches. For example, the system can cause an illumination device that projects red light to be coordinated with a camera that has a red filter attached, and an illumination device that projects blue light to be synchronized with a camera that has a blue filter attached, and the system can further ensure that the red light and blue light are not illuminated at the same time.

The controller can also activate the illumination device for a configured duration, after which the controller deactivates the illumination device.

In some implementation, a single controller device can have attached multiple illumination devices. In such cases, the controller can maintain, for each attached device, a separate counter with a separate configuration.

In operation 330, the system actives one or more camera devices. As described with reference to FIG. 2, the system can contain controllers that have attached one or more camera devices. A controller can receive a timing pulse generated in operation 310 and in response, activate one or more attached camera devices.

Analogously to the operation of illumination devices, in some implementations, a controller can be configured to activate an attached camera device only after receiving a configured number of timing pulses. In such cases, the controller can increment a counter upon receiving each timing pulse. Once the counter reaches the configured threshold, the controller can reset the counter to zero and activate the camera device. In addition, the controller can ignore a configured number of pulses before beginning to increment the counter. For example, a controller can be configured to activate a camera device upon receiving the second timing pulse and every fourth pulse thereafter. In this example, the controller can initially set the counter to 2, which would cause the controller to ignore the first timer pulse, activate on the second timing pulse, ignore pulses 3 to 5, activate on pulse 6 and so on. In summary, allowing controllers to stagger activation—that is, allowing devices to begin on different pulses—enables more flexible synchronization approaches.

In some implementations, a single controller device can have attached both one or more illumination devices and one or more camera devices, and therefore a single controller device can execute both operations 320 and 330. In such cases, the controller maintains, for each attached device, a separate counter with a separate configuration, and can take multiple actions in response to receiving a timer pulse.

In operation 340, upon completing operations 320 and 330, the system captures one or more images. The system can associate with each captured image an indication of the camera that captured the image, an indication of any filters attached to the camera that captured the image, an indication of any illumination devices that were activated, the time the image was captured, and other metadata.

In decision operation 345, the system determines whether an illumination device was transmitting light of in same frequency range that was permitted by the filter attached to the camera that captured the image. In operation 340, indications were associated with the image, for example, indications of the camera and of the filter, and an indication of any illumination device, so the system can retrieve those indications and compare the filter frequency range to the illumination frequency range. If the frequency ranges do not match, the system proceeds to operation 350. If the frequency ranges do match, the system determines that the image taken was not a synchronization image and returns to operation 310.

In operation 350, the system analyzes at least one image captured in operation 340. A purpose of the analysis operation 350 can be to determine whether the proper illumination device(s) were operating in sync with the camera device that captured the image being analyzed. The determination can be made by analyzing the intensity of illumination as exhibited in data that represents an image captured by a camera device with an attached filter, where the filter is configured to block light in the frequency range emitted by an illumination device that is active at the time of image capture. For example, if a camera has a red filter, and the system is configured to illuminate the scene with only blue light, the resulting image should be dark. Conversely, if a camera has a red filter, and the system is configured to illuminate the scene with only red light, the resulting image should not be dark.

In some implementations, to analyze the image, the system analyzes each pixel in the image to determine the relative luminance of the pixels in the image. If the system is properly synchronized, since the scene will be illuminated only with light of frequencies blocked by the filter, the average relative luminance of the pixels should be below a configured threshold.

As described previously, the system uses a black and white camera to validate synchronization. In such cases, the relatively luminance of a pixel can be the pixel value, where black is represented as zero and white is represented by a maximum value, preferably 255. The system can sum the pixel values and divide by the number of pixels to determine the average relative luminance of the pixels in the image.

In some implementations, the system can use color camera devices. In such cases, the system operates as described previously, except for the calculation of relative luminance for each pixel. For color cameras, the relative luminance can be computed as a linear combination of the red, green and blue components of the pixel value, such as: $0.2126R+0.7152G+0.0722B$, where R is the red value, G is the green value and B is the blue value for the pixel.

In decision operation 360, the system determines whether the system is in synch. If the average luminance, as determined in operation 350, is below a configured threshold, the system determines that the synchronization has been verified and transitions to operation 365. Instead, if the average luminance is above a threshold, the system determines that the system is out of sync and proceeds to operation 370.

In operation 365, the system determines that the images are properly illuminated. As part of determining images are properly illuminated, the system can optionally provide the images to an analysis system where the images can be analyzed, for example, to determine the presence of parasites. Once this operation is completed, the system then returns to operation 310.

In operation 370, the system determines that, since the system was not properly synchronized, the images taken are improperly illuminated. Optionally, the system can delete the images, mark them as improperly illuminated, provide them to a training system as examples of improperly illuminated images, etc.

In operation 380, in response to determining that the system is not in sync, the system can optionally perform one or more remedial actions. Remedial actions can include entering a message in an error log, sending a message to supervisory component, sending a message to a management console, similar actions or any combination. Instead or in addition, the system can take corrective actions, such as causing the components of the system to reset to an initial state. Once the optional remediation actions have been completed, the system returns to operation 310.

Figure 4:
FIG. 4 is an illustration that contains images produced by of a framework for verifying controller synchronization.
Figure 4:
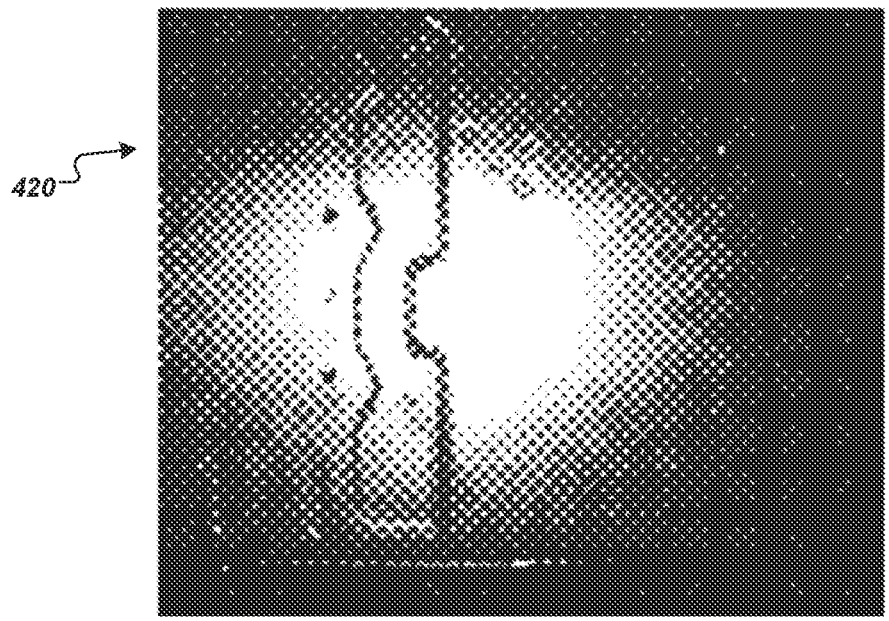

FIG. 4 is an illustration that contains images produced by of a framework for verifying controller synchronization. In the first image 410, the scene was illuminated with blue light, and the camera contains a red filter, so the first image 410 appears dark. This condition indicates that the system is correctly synchronized. In the second image 420, the scene was illuminated with blue light, and the camera contains a blue filter, so the image 420 appears illuminated. This condition indicates that the system is not correctly synchronized.

While this specification has largely described an implementation of a framework that verifies controller synchronization, the framework can also be used to detect defects in lighting devices. For example, while activating a device configured to produce light in a particular frequency range, the framework can capture an image with a camera device that has attached a filter configured to permit only light of that particular frequency range. Using the techniques described previously, the framework can compare the intensity of the light in the captured image to a configured threshold, and if the intensity is below that threshold, transmit an indication of a potential lighting defect.

In addition, while this specification has largely described an implementation of framework that verifies controller synchronization in an aquaculture environment, other implementations can apply to systems that capture images of other living creatures.

In one such implementation, a framework for verifying controller synchronization can be used in conjunction with a system that uses illumination devices and imaging devices to detect external parasites on cattle, such as horn flies, lice and grubs. Such as implementation of the framework can verify the synchronized operation of illumination devices that illuminate such parasites with the operation of imaging devices that capture images of the parasites. Images that are not properly illuminated, that is, the images were captured when the framework determined that the system was not synchronized, can be withheld from the system that uses images to detect cattle parasites.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   accessing, by an image processor, a schedule indicative of synchronization of each of:
   (i) a first camera having a filter that allows light of a first frequency to pass through, with a first illumination device that illuminates scenes with light of the first frequency, and
   (ii) a second camera having a filter that allows light of a second frequency to pass through, with a second illumination device that illuminates scenes with the light of the second frequency,
   receiving a group of images, each image in the group captured by one of (i) the first camera, or (ii) the second camera, wherein the group of images include a first image that was taken by the first camera and a second image that was taken by the second camera;
   determining, by the image processor, that at least one of (i) an intensity value of the first frequency in the first image or (ii) an intensity value of the second frequency in the second image does not satisfy a corresponding threshold condition;
   determining that synchronization according to the schedule has been disturbed;
   in response to determining that synchronization according to the schedule has been disturbed, excluding, by the image processor, the first and second images from evaluation by a machine learning model that evaluates images; and
   evaluating the group of images excluding the first and second images by the machine learning model.

2. The computer-implemented method of claim 1, further comprising:
   responsive to determining that the schedule has been disturbed, causing the components of the system to reset to an initial state.

3. The computer-implemented method of claim 1, further comprising:
   receiving a group of images each taken by the first camera or the second camera, wherein the group of images include a third image that was taken by the first camera and a fourth image that was taken by the second camera;

determining, by the image processor, that an intensity value of the first frequency in the third image satisfies the threshold value and that an intensity value of the second frequency in the fourth image satisfies the threshold value; and determining that synchronization according to the schedule has not been disturbed.

4. The computer-implemented method of claim 3 further comprising:

in response to determining that synchronization according to the schedule has not been disturbed, including, by the image processor, the third and the fourth images for evaluation by a machine learning model that evaluates images; and evaluating the group of images including the third and fourth images by the machine learning model.

5. The computer-implemented method of claim 3 further comprising:

in response to determining that synchronization according to the schedule has not been disturbed, providing the third image to a parasite detection system.

6. The computer-implemented method of claim 1, wherein at least one of the first frequency or the second frequency is in a range of (i) 400 terahertz to 790 terahertz, (ii) 430 terahertz to 490 terahertz, or (iii) 620 terahertz to 680 terahertz.

7. The computer-implemented method of claim 1, comprising:

based on determining that the aquaculture environment was illuminated with light of a particular light frequency when the image was generated, generating, by the image processor, an error indicator.

8. The computer-implemented method of claim 1 further comprising:

receiving, by an image processor, a second image that was generated (i) by a second image generating device that includes a second light filter that is associated with light of a second particular light frequency, and (ii) while an aquaculture environment was illuminated with light; and based on determining that the aquaculture environment was not illuminated with light of the second particular light frequency when the second image was generated, generating, by the image processor, an indicator that the second image is properly illuminated.

9. The computer-implemented method of claim 8 further comprising:

in response to determining that the aquaculture environment was not illuminated with light of the second particular light frequency when the second image was generated, providing the second image to a parasite detection system.

10. The computer-implemented method claim 1, wherein the received image was generated while the aquaculture environment was illuminated with light of a frequency that was not determined at the time the received image was generated.

11. A computer-implemented system comprising:

one or more processors; and machine-readable media interoperably coupled with the one or more processors and storing one or more instructions that, when executed by the one or more processors, perform operations comprising:

accessing, by an image processor, a schedule indicative of synchronization of each of:

(i) a first camera having a filter that allows light of a first frequency to pass through, with a first illumination device that illuminates scenes with light of the first frequency, and (ii) a second camera having a filter that allows light of a second frequency to pass through, with a second illumination device that illuminates scenes with the light of the second frequency, receiving a group of images, each image in the group captured by one of (i) the first camera, or (ii) the second camera, wherein the group of images include a first image that was taken by the first camera and a second image that was taken by the second camera;

determining, by the image processor, that at least one of (i) an intensity value of the first frequency in the first image or (ii) an intensity value of the second frequency in the second image does not satisfy a corresponding threshold condition;

determining that synchronization according to the schedule has been disturbed;

in response to determining that synchronization according to the schedule has been disturbed, excluding, by the image processor, the first and second images from evaluation by a machine learning model that evaluates images; and evaluating the group of images excluding the first and second images by the machine learning model.

12. The computer-implemented system of claim 11, further comprising:

responsive to determining that the schedule has been disturbed, causing the components of the system to reset to an initial state.

13. The computer-implemented system of claim 11, further comprising:

receiving a group of images each taken by the first camera or the second camera, wherein the group of images include a third image that was taken by the first camera and a fourth image that was taken by the second camera;

determining, by the image processor, that an intensity value of the first frequency in the third image satisfies the threshold value and that an intensity value of the second frequency in the fourth image satisfies the threshold value; and determining that synchronization according to the schedule has not been disturbed.

14. The computer-implemented system of claim 13 further comprising:

in response to determining that synchronization according to the schedule has not been disturbed, including, by the image processor, the third and the fourth images for evaluation by a machine learning model that evaluates images; and evaluating the group of images including the third and fourth images by the machine learning model.

15. The computer-implemented system of claim 13 further comprising:

in response to determining that synchronization according to the schedule has not been disturbed, providing the third image to a parasite detection system.

16. The computer-implemented system of claim 11, wherein at least one of the first frequency or the second frequency is in a range of (i) 400 terahertz to 790 terahertz, (ii) 430 terahertz to 490 terahertz, or (iii) 620 terahertz to 680 terahertz.

17. The computer-implemented system of claim 11, comprising:

based on determining that the aquaculture environment was illuminated with light of a particular light frequency when the image was generated, generating, by the image processor, an error indicator.

18. The computer-implemented system of claim 11 further comprising:
receiving, by an image processor, a second image that was generated (i) by a second image generating device that includes a second light filter that is associated with light of a second particular light frequency, and (ii) while an aquaculture environment was illuminated with light; and
based on determining that the aquaculture environment was not illuminated with light of the second particular light frequency when the second image was generated, generating, by the image processor, an indicator that the second image is properly illuminated.

19. The computer-implemented system of claim 18 further comprising:
in response to determining that the aquaculture environment was not illuminated with light of the second particular light frequency when the second image was generated, providing the second image to a parasite detection system.

20. A non-transitory, computer-readable medium storing one or more instructions executable by a computer system to perform operations comprising:
accessing, by an image processor, a schedule indicative of synchronization of each of:
(i) a first camera having a filter that allows light of a first frequency to pass through, with a first illumination device that illuminates scenes with light of the first frequency, and
(ii) a second camera having a filter that allows light of a second frequency to pass through, with a second illumination device that illuminates scenes with the light of the second frequency,
receiving a group of images, each image in the group captured by one of (i) the first camera, or (ii) the second camera, wherein the group of images include a first image that was taken by the first camera and a second image that was taken by the second camera;
determining, by the image processor, that at least one of (i) an intensity value of the first frequency in the first image or (ii) an intensity value of the second frequency in the second image does not satisfy a corresponding threshold condition;
determining that synchronization according to the schedule has been disturbed;
in response to determining that synchronization according to the schedule has been disturbed, excluding, by the image processor, the first and second images from evaluation by a machine learning model that evaluates images; and
evaluating the group of images excluding the first and second images by the machine learning model.

* * * * *